L. S. WELLS.
SYSTEM FOR RECORDING ELECTRICAL PHENOMENA.
APPLICATION FILED JUNE 21, 1919.

1,340,197.

Patented May 18, 1920.
3 SHEETS—SHEET 1.

INVENTOR
L. S. Wells
BY
T. F. Bourne
ATTORNEY

L. S. WELLS.
SYSTEM FOR RECORDING ELECTRICAL PHENOMENA.
APPLICATION FILED JUNE 21, 1919.
1,340,197.
Patented May 18, 1920.
3 SHEETS—SHEET 3.
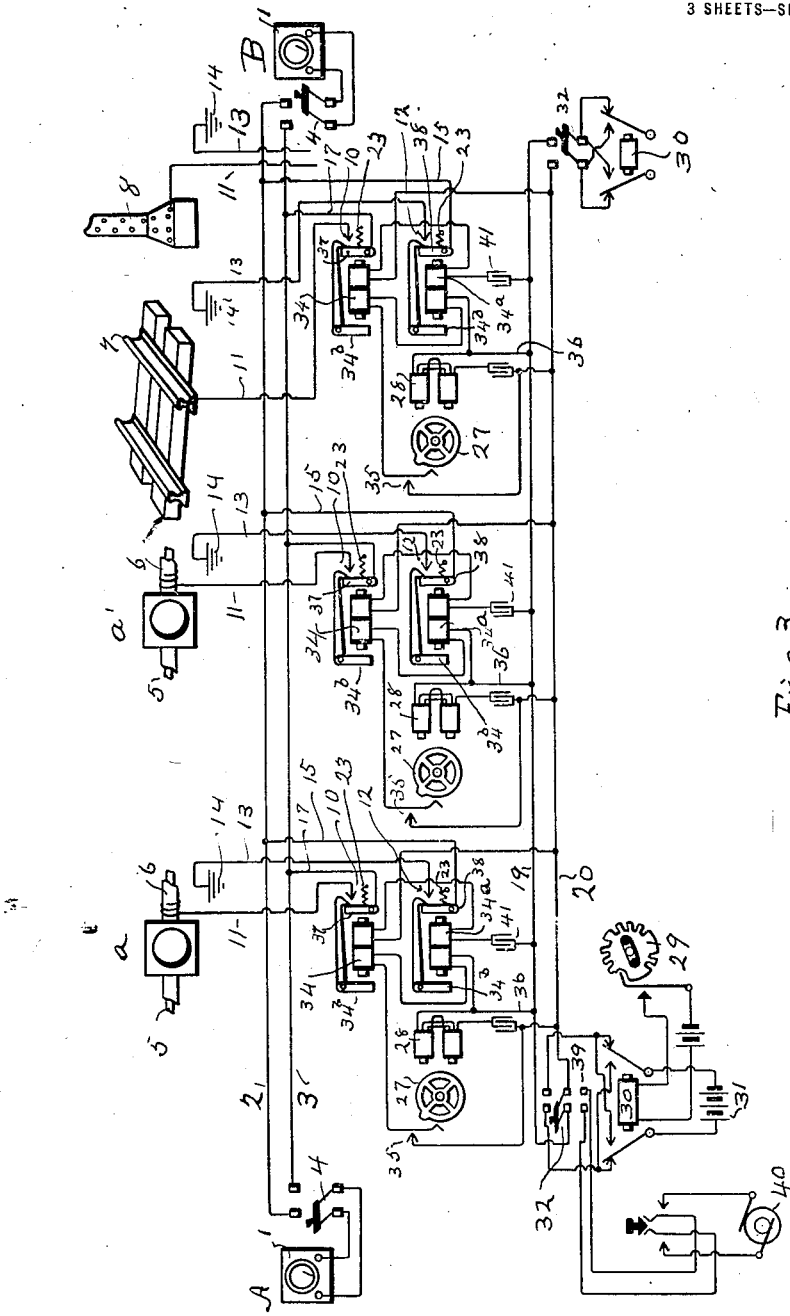
INVENTOR
L. S. Wells
BY T. F. Bourne
ATTORNEY

UNITED STATES PATENT OFFICE.

LOREN S. WELLS, OF NEW YORK, N. Y.

SYSTEM FOR RECORDING ELECTRICAL PHENOMENA.

1,340,197.  Specification of Letters Patent.  Patented May 18, 1920.

Application filed June 21, 1919. Serial No. 305,875.

*To all whom it may concern:*

Be it known that I, LOREN S. WELLS, a citizen of the United States, and resident of New York city, borough of Manhattan, in the county of New York and State of New York, have invented certain new and useful Improvements in Systems for Recording Electrical Phenomena, of which the following is a specification.

Electrical conductors such as sheaths of underground electrical cables, railway rails and third rails of railway lines, and various forms of metallic structures, are subject to deterioration or injury due to electrolysis from external currents or from leakage to ground currents carried by such cables or rails, etc., and it is of particular importance to be able to readily determine the approximate points at which the cable sheath, rail or structure is being subjected to such destructive currents.

The object of my invention is to provide means to enable the recording at one or more stations at which recording instruments are located of the approximate points where difference of potential or other phenomena occur remote from such instrument, such as difference of potential between electrical conductors and ground, such as between a cable sheath and ground, a rail and ground, a metallic structure and ground, or the potential of a third-rail or other conductor, the record being taken at some point remote from the point where the recorded phenomena occurs.

In carrying out my invention I provide test lines equipped with a recording instrument at a station, which lines extend from such station along points remote from such instrument, and at desired points where the aforesaid phenomena is to be detected means are provided to connect such lines with ground and with the cable sheath, rail or structure to be tested, and I also provide means operated from such station to select any of such points to connect the cable, rail or structure thereat to such test lines, whereby any one of such points may be electrically connected through such test lines to such recording instrument for indicating thereon any difference of potential between the cable sheath, rail or structure and ground at such point.

My invention comprises novel details of improvement that will be more fully hereinafter set forth and then pointed out in the claims.

Reference is to be had to the accompanying drawings forming a part hereof wherein—

Figure 1:
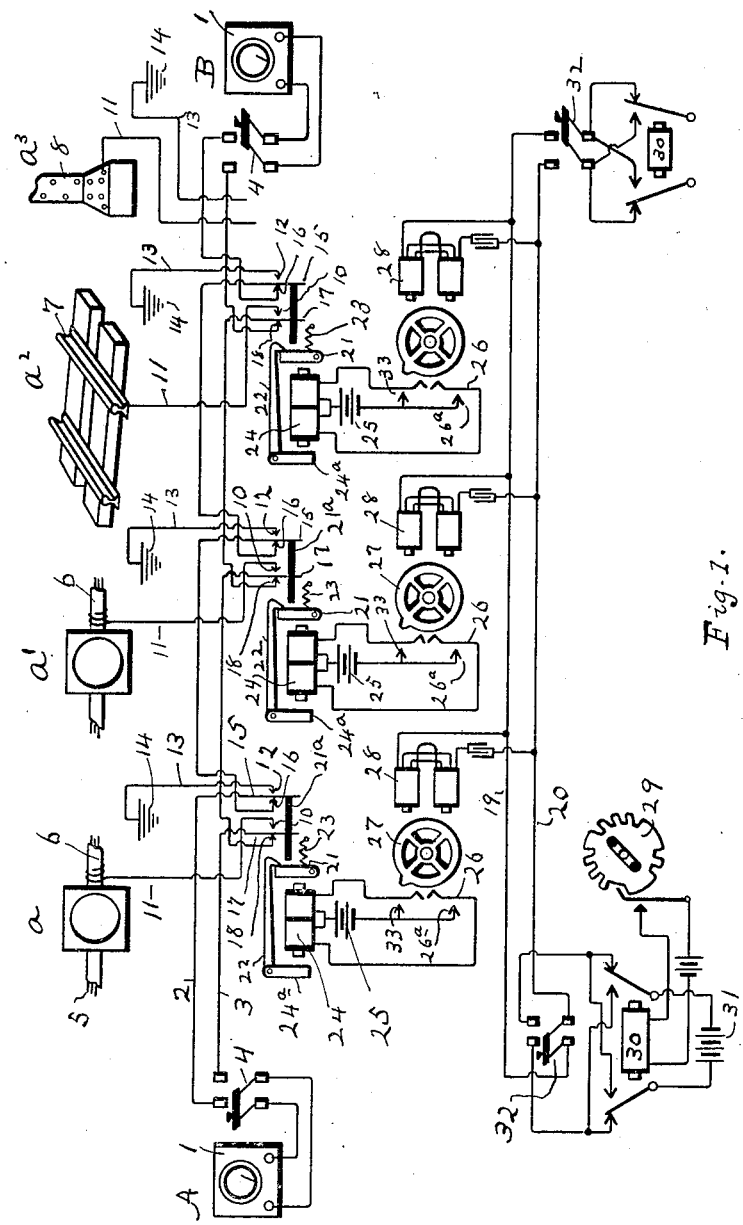

Figure 1 is a diagrammatic view illustrating my improvements in connection with test lines adapted to be broken on the slide beyond the point at which the testing of the cable sheath, rail or structure is to be effected from a station having a recording instrument on the line, whereby testing of different points from opposite ends of the line may be effected simultaneously.

Figure 2:
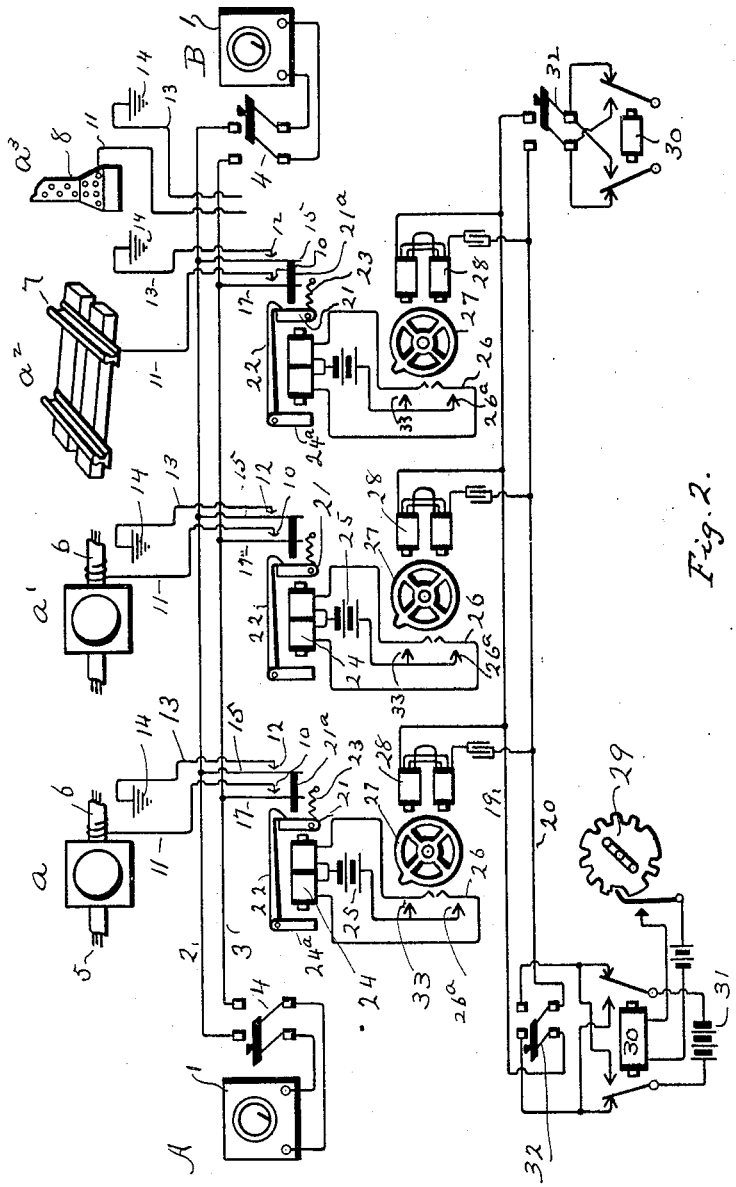

Fig. 2 is a similar view illustrating my improvements in connection with a line adapted for testing from one end only at different times without breaking the testing lines beyond the point being tested; and Fig. 3 is a similar view illustrating my improvements arranged with a current generator for the selecting line at a central or home station and without requiring local batteries at the several points along the line where the aforesaid phenomena is to be tested and recorded at the home station.

Similar letters and numerals of reference indicate corresponding parts in the several views.

At a central or home station indicated at A is located a recording volt meter 1 which may be of any well known construction adapted to record differences of potential between electrical conductors and ground, the appropriate terminals of which meter are connected to suitable conductors 2, 3 of a test line. A suitable switch at 4 is provided to connect meter 1 with the conductors 2 and 3 and disconnect the meter therefrom as required. In the example illustrated the conductors 2, 3 extend between station A and another station B distant from A, at which station B is located a recording volt meter 1 and switch 4 in the manner described with respect to station A. The lines or conductors 2, 3 extend along, and preferably suitably adjacent to, electrical conductors such as a cable 5 having a metallic sheath 6, or railway track or third-rail 7, or a metallic structure such as a building, bridge or the like indicated at 8, at any desired number of points along the line of conductors 2, 3 remote from the station A or B, where it is desired to test and record the difference of potential between the cable, sheath, rail or other structure and ground, such as at points $a, a', a^2, a^3$. Such sheath, rail or structure is connected to a contact 10, as by a conductor 11 and an associate contact 12 is connected by conductor 13 to ground 14 adjacent to the sheath, rail or structure. In Fig. 1 the line 2 at each such station point has normally engaged contacts 15, 16 and at each such station the line 3 has normally engaged contacts 17, 18. The contacts 15, 17 are shown as spring contacts adapted when operated to break the lines 2, 3 at a station $a, a'$, etc. and connect said lines respectively with contacts 12, 10 to connect line 3 with the cable sheath, rail or structure and to connect line 2 with ground 14, whereby the meter 1 of a station A or B may be connected to such sheath, rail or structure and ground, and the lines 2, 3 beyond will be cut off from said meter to permit the use of the lines between such point and the other or then non-operating station A or B. The lines 2, 3 are normally maintained open at switches 4 so that when the meter 1 is, at station A or B, to be used for recording from a remote station $a, a', a^2, a^3$, the corresponding switch 4 will be closed.

In order to select for testing the station $a, a', a^2$, etc., desired, I provide selective means controllable over lines or conductors 19, 20 extending similarly from station A or between stations A and B, which lines are normally open at opposite ends. Selecting devices at the remote stations $a, a', a^2$, etc., comprise armature 21 normally retained by latch 22 against action of spring 23 to keep contacts 15, 16 and 17, 18 respectively together to provide closed lines 2, 3 through such stations, whereby when the left hand winding of relay 24 is energized its armature 24ª will operate the latch to release armature 21 to cause it to operate contacts 15, 17 by insulation 21ª to break lines 2, 3 and close such lines at contacts 10, 12 with the cable sheath and other conductor and ground before described. A local battery 25 and contacts 26, 26ª at each station $a, a', a^2, a^3$ are adapted to be closed with relay 24 by a rotor 27 operated by a magnet 28 whose terminals are connected to lines 19, 20, which magnets 28 are operated for the selection of a desired station by means of a code wheel 29 controlling the circuit over lines 19, 20 and located at a home station A, B. When the code wheel is revolved it will open and close contacts thereat to energize relay 30 to open and close contacts controlled by its armatures in order to send impulses alternating in polarity from battery 31 over lines 19, 20 to energize magnets 28 of remote stations for stepping all of the selectors at such stations, the arrangement being such that at the completion of the rotation of the code wheel 29 only the desired one of the particular remote stations will have been selected and its local contacts closed for connecting lines 2, 3 with the cable sheath, rail or structure and ground thereat. A switch 32 is adapted to open and close selector lines 19, 20 at the recording station A or B and since said switch should be open at a station A or B when the line is not being used either of such stations will be free to use the selector line. When a station $a, a'$, etc., has been selected and the cable sheath, rail or structure and adjacent ground have been connected to meter 1 at the selecting or recording station, the difference of potential between such sheath, rail or structure and adjacent ground 14 will be recorded in the corresponding meter 1. After such record has been taken the selector at the recording station A or B is again operated to cause closing of contact 33 through the right hand winding of relay 24 to cause armature 21 to be attracted for retention by latch 22, whereby to break from lines 2, 3 the previously connected cable sheath, rail or structure and adjacent ground 14 and restore lines 2, 3 through the corresponding remote station. Contact 33 is operated by a series of impulses which may be common to a number of stations. It is immaterial if contact 33 is operated before contact 26 upon selection of a remote station because armature 21 will have been reset by a previous operation. To close circuit at contact 33 a separate code wheel substantially similar to code wheel 29 at the recording station is operated to cause the current to operate the associate magnet 28. In practice it may be merely necessary to use a single reset code wheel to cause resetting of the selector devices at all of the remote stations. The particular construction of selector devices illustrated are in themselves well known for telephone and telegraph selectors, and it will be understood that any suitable selector devices may be utilized for connecting and disconnecting the sheath, rail or structure and adjacent ground with and for disconnecting them from the lines or conductors 2, 3.

From what has been described it will be understood that by the installation of a recording meter at a recording or home station with lines such as 2, 3 extended therefrom for connection, as desired, with any of several conductors, such as cable sheaths, rails or structures, the recording of difference of potential or other phenomena thereat may be accomplished in the meter at the recording or home station by merely selecting the desired remote point to be tested and connecting it with lines 2, 3, whereby after the record has been taken on the meter the line may be restored and another station may be selected for recording the phenomena thereat in said meter and so on. An advantage is that the recording meter can be observed at all times during testing, and it is not necessary to have a man carry a meter to a place to be tested, set it in place and connect it with the object and ground to be tested and leave the meter for a period, return and disconnect the meter and carry it back to the station to obtain the record, as heretofore has been the practice as known to me. By means of my invention it will be understood that records from any station or point $a$, $a'$, $a^2$, etc., remote from the recording station may be obtained at all times in a simple, and convenient manner.

In accordance with Fig. 1 if station $a'$ is being tested from recording station A, any station between $a'$ and recording station B may be tested at the same time, and conversely.

If it is desired to install my improvements in such a manner that testing from one end only of the line 2, 3 may be made station A or B may be omitted, or if testing is to be made from the opposite ends of such lines at different times only the stations A, B may be used, and the lines 2, 3 equipped as illustrated in Fig. 2, where said lines are normally open at the ends but said lines are closed through and are not to be broken at the remote stations $a$, $a'$, $a^2$, etc. At such stations the contacts 10, 12 are shown respectively connected to the cable sheath, and other conductors 7, 8 and ground 14, the spring contact 15 being connected with line 2 and spring contact 17 being connected to line 3, the other parts being similar to Fig. 1. When the selector magnet 28 at a remote station is energized as before described, the circuit of the left hand winding of relay 24 will be closed at 26, 26ª through battery 25, whereby armature 21 will be released and its spring 23 will cause it to close circuit between 12, 15 and 10, 17 to connect recording meter 1 at a recording station, such as A, with such cable sheath or other conductor and ground 14 to cause recording of difference of potential or other phenomena between the cable sheath, etc., and said group in the manner before described. When the record has been taken the magnet 28 will be again operated from the selecting reset code wheel to close the circuit of the right hand winding of relay 24 at 33, as before described, for attraction of armature 21 and breaking of circuit at 12, 15 and 10, 17, in the manner before described. With the construction described the same advantages of selection of a remote station and connecting sheath, rail or structure and adjacent ground with the recording volt meter is present as described respecting Fig. 1, with the exception that the record may be taken at only one remote station at one time.

In accordance with Figs. 1 and 2 it is necessary to utilize a local battery at each testing station $a$, $a'$, $a^2$, etc., to operate the local contacts for the operation of a relay to connect testing wires 11, 13 to the testing lines, but if it is not desired to install a local battery at each of the several testing points or remote stations the desired connections may be established thereat by using two relays, or a relay combined to perform the functions of two relays, illustrated at 34, 34ª in Fig. 3. Selection of a desired remote station $a$, $a'$, $a^2$, etc., is made by operating code wheel 29 at the recording station A or B to cause operation of the magnet 28 at the test station, whereby contact is made at 35 at such station connecting selecting line 20 through said contact with the left hand windings of relays 34, 34ª back to selecting line 19 through conductor 36 so that both relays 34, 34ª will operate armatures 34ᵇ to permit their respective armatures 37, 38 to be operated by the respective springs 23 to establish a connection between the cable sheath, rail or structure 8 through conductor 11, contact 10, armature 37, conductor 17 and test line 3 to meter 1, and from the latter through test line 2, conductor 15, armature 38, contact 12, conductor 13, ground 14, and thence to the cable sheath, rail or structure at the particular remote station. After the record has been taken upon meter 1 at the recording station the connections are restored to normal by throwing the switch 32 from lines 19, 20 to contacts at 39 at the recording station that are in electrical connection with terminals of a magneto generator 40, so that upon operation of the latter an alternating current may be sent over the selecting line 19, through condenser 41 and through right hand windings of relays 34, 34ª and return over line 20 to cause attraction of their armatures and breaking of connection between the cable sheath, rail or structure and ground 14 and the test lines 2, 3.

In accordance with my invention it will be understood that the same cable sheath or rail may be tested at the home station from different points thereon on the same test line, and that separate conductors at spaced points along such test lines may be tested with or without said cable sheath or rail arranged to be tested on the same test line. It also will be understood that my invention is not limited to the particular details of construction set forth and the same may be varied within the scope of the appended claims without departing from the spirit of my invention.

Having thus described my invention, what I claim and desire to secure by Letters Patent is:—

1. A system for recording electrical phenomena comprises a recording instrument at a station, a testing line extending from such instrument, selecting instrumentalities at spaced points along said line comprising means to connect said line with an electrical conductor and ground at such points, and selector mechanism at said station having a circuit for selectively operating either of such instrumentalities to connect said recording instrument with such electrical conductor and ground at a selected point.

2. A system for recording electrical phenomena comprising a recording instrument at a station, a testing line extending from such instrument, selecting instrumentalities at spaced points along said line comprising means to connect said line with an electrical conductor and ground at such points, and selector mechanism at said station having a circuit for selectively operating either of such instrumentalities to connect said recording instrument with such electrical conductor and ground at a selected point, said electrical instrumentalities comprising means to break said testing line at a selected point on the side of the line beyond the selected conductor and ground.

3. A system for recording electrical phenomena comprising recording instruments at spaced stations, a normally open testing line extending between said instruments, means to connect said instruments with said lines, selecting instrumentalities at spaced points along said line, means to connect said line with an electrical conductor and ground at any of such points between said stations, and selector mechanism at said stations having a normally open circuit therebetween for selectively operating either of said instrumentalities from either of said stations to connect the corresponding recording instrument with said electrical conductor and ground at a selected point.

4. A system for recording electrical phenomena comprising recording instruments at spaced stations, a normally open testing line extending between said instruments, means to connect said instruments with said lines, selecting instrumentalities at spaced points along said line, means to connect said line with an electrical conductor and ground at any of such points between said stations, and selector mechanism at said stations having a normally open circuit therebetween for selectively operating either of said instrumentalities from either of said stations to connect the corresponding recording instrument with said electrical conductor and ground at a selected point, said instrumentalities comprising means to break said testing line on the side beyond the selected point.

5. A system for recording electrical phenomena comprising a recording instrument at a station, a normally open circuit extending therefrom, means to connect the instrument with said circuit, contacts connected with said circuit at spaced points therealong, contacts at such points respectively coöperative with the first named contacts and connected respectively to a conductor and ground at such points, electrical instrumentalities at such to close and open such contacts thereat, and selector mechanism at the first named station having a circuit to control each of such instrumentalities at said points to cause the closing and opening of points to cause the closing and opening of the aforesaid contacts at a selected point for connecting a corresponding electrical conductor and ground thereat with the first named circuit.

6. A system for recording electrical phenomena comprising a recording instrument at a station, a normally open circuit extending therefrom, means to connect the instrument with said circuit, contacts connected with said circuit at spaced points therealong, contacts at such points respectively coöperative with the first named contacts and connected respectively to a conductor and ground at such points, electrical instrumentalities at such points to close and open such contacts thereat, and selector mechanism at the first named station having a circuit to control each of such instrumentalities at said points to cause the closing and opening of the aforesaid contacts at a selected point for connecting a corresponding electrical conductor and ground thereat with the first named circuit, other contacts in said first named circuit at such points, said instrumentalities having means to break the circuit through said contacts at a selected point.

7. A system for recording electrical phenomena comprising a recording instrument at a station, test wires extending from said instrument past points distant therefrom, pairs of normally open contacts at such points respectively connected with one of said wires and with a conductor and with the other of said wires and with ground at such points, electrical instrumentalities at such points to close and open the pairs of contacts thereat, and selector mechanism at said station having a selector line parallel with said test wires and connected with magnets of said instrumentalities respectively for causing operation thereof, said selector mechanism comprising means to cause operation of said magnets for connecting the corresponding pairs of contacts and means to cause operation of said instrumentalities to break said contacts.

8. A system for recording electrical phenomena comprising a recording instrument at a station, test wires extending from said instrument past points distant therefrom, pairs of normally open contacts at such points respectively connected with one of said wires and with a conductor and with the other of said wires and with ground at such points, electrical instrumentalities at such points to close and open the pairs of contacts thereat, and selector mechanism at said station having a selector line parallel with said test wires and connected with magnets of said instrumentalities respectively for causing operation thereof, said selector mechanism comprising means to cause operation of said magnets for connecting the corresponding pairs of contacts and means to cause operation of said instrumentalities to break said contacts, and other contacts in said test wires at such points, said instrumentalities having means to break the circuit through said contacts at a selected point.

9. A system for recording electrical phenomena comprising a recording instrument at a station, a pair of test lines extending therefrom, pairs of normally open contacts connected with said lines respectively at distant points therealong, a contact of one pair being connected to a conductor and a contact of another pair being connected with ground adjacent said conductor at each of such distant points, a relay having an armature at each of said points, said relay having a winding and means to cause its armature to operate to close said contacts at each of such points and having a winding to operate its armature to break said contacts, means at each distant point to control the operation of said relay thereat, and selector mechanism at the first named station, selector lines leading from said mechanism through said distant points and connected with means thereat for causing operation of said relays respectively for operating the corresponding armature to close and break said contacts at a selected point.

10. A system for recording electrical phenomena comprising recording instruments at spaced stations, a pair of test lines extending between said stations and normally open at said stations, means at said stations to connect the test lines to a corresponding recording instrument, pairs of normally open contacts connected with said lines respectively at distant points therealong, a contact of one pair being connected to a conductor and a contact of another pair being connected with ground adjacent said conductor at each of such distant points, a relay having an armature at each of said points, said relay having a winding and means to cause its armature to operate to close said contacts at each of such points and having a winding to operate its armature to break said contacts, means at each distant point to control the operation of said relay thereat, selector mechanisms at the first named stations, and selector lines between said mechanisms normally open at said stations and leading from said mechanisms through said distant points and connected with means thereat for causing operation of said relays respectively for operating the corresponding armature to close and break said contacts at a selected point.

Signed at Old Forge, in the county of Herkimer and State of New York, this 19th day of June, A. D. 1919.

LOREN S. WELLS.